United States Patent [19]

Blount

[11] 4,242,497

[45] Dec. 30, 1980

[54] PRODUCTION OF AMINO-SILICATE COMPOUNDS, CONDENSATION RESINOUS PRODUCTS

[76] Inventor: David H. Blount, 5450 Lea St., San Diego, Calif. 92105

[21] Appl. No.: 110,925

[22] Filed: Jan. 10, 1980

Related U.S. Application Data

[60] Division of Ser. No. 955,327, Oct. 27, 1978, Pat. No. 4,185,147, Continuation-in-part of Ser. No. 786,617, Apr. 4, 1977, Pat. No. 4,169,930, which is a division of Ser. No. 652,338, Jan. 26, 1976, Pat. No. 4,033,935, which is a continuation-in-part of Ser. No. 71,628, Sep. 11, 1970, abandoned.

[51] Int. Cl.³ .......................... C08G 2/00; C08J 9/14

[52] U.S. Cl. ........................ 528/232; 521/100; 521/107; 521/108; 521/130; 521/154; 528/242; 528/243; 528/245; 528/254; 528/264

[58] Field of Search ............ 521/154, 100, 107, 108, 521/130; 528/232, 242, 425

[56] References Cited

U.S. PATENT DOCUMENTS

| | | | |
|---|---|---|---|
| 4,100,112 | 7/1978 | Blount | 260/18 S |
| 4,125,703 | 11/1978 | Blount | 528/95 |
| 4,129,696 | 12/1978 | Markusoh et al. | 521/154 |
| 4,185,147 | 1/1980 | Blount | 521/130 |

Primary Examiner—Morton Foelak

[57] ABSTRACT

Poly(aldehyde amino silicate) foams are produced by mixing an amino compound, an aldehyde, a silicon oxide compound and a blowing agent; then a curing agent is added, thereby producing a rigid, porous product.

22 Claims, No Drawings

PRODUCTION OF AMINO-SILICATE COMPOUNDS, CONDENSATION RESINOUS PRODUCTS

CROSS-REFERENCE TO RELATED APPLICATIONS

This application is a divisional of U.S. Pat. application Ser. No. 955,327, filed Oct. 27, 1978 now U.S. Pat. No. 4,185,147 issued Jan. 22, 1980, which is a continuation-in-part of my copending application, Ser. No. 786,617, filed Apr. 4, 1977, which is a division of U.S. Pat. application, Ser. No. 652,338, filed Jan. 26, 1976, now U.S. Pat. No. 4,033,935, which is a continuation-in-part of my earlier U.S. Pat. application, Ser. No. 71,628, filed Sept. 11, 1970, now abandoned.

BACKGROUND OF THE INVENTION

This invention relates to the production of poly(aldehyde amino silicate) resinous products. The amino compound is reacted with an oxidated silicon compound, then an aldehyde. A blowing agent is added. The mixture is then cured by a curing agent which produces a pH of 4 to 6.5 and/or reacts with any alkali metal groups, thereby producing a rigid, porous product.

The poly(aldehyde amino silicate) porous resinous products may be utilized as thermal insulating material, as sound insulating material, as shock-resistant packaging, as impregnating agents, as adhesives, as putty materials, etc.

In the process according to the invention, at least 5 components are used to produce the novel foaming poly(aldehyde amino silicate) resinous products as follows:
1. Component A: an oxidated silicon compound
2. Component B: an amino compound
3. Component C: an aldehyde
4. Component D: a blowing agent
5. Component E: a curing agent Other components may be added, such as alkali or acid catalyst, surfactant, foam stabilizers, modifiers, fillers, water-binding agents and mixtures thereof.

Component A

The oxidated silicon compounds may be produced by any of the commonly known methods in the arts. They are preferred to be in a fine granular form or in an aqueous solution and/or suspension.

The oxidated silicon compounds include hydrated silica, hydrated silica containing Si-H bonds (silicoformic acid), silica and natural occurring oxidated silicon compounds which contain free silicic acid groups. The hydrated silica includes various silicon acids such as dry silicic acid gel, orthosilicic acid, metasilicic acid, monosilandiol, polysilicoformic acid (Leucone), silica sol or mixtures thereof.

The oxidated silicon compound may also be used in the form of alkali metal silicates, alkaline earth metal silicates, metal silicates and mixtures thereof, and may also be mixed with the oxidated silicon compounds. Hydraulic cement containing oxidated silicon compounds may be used alone or in combination with silica sol and/or alkali metal silicates. The curing agent, especially when a mineral acid is used, reacts with the alkali metal silicates, alkaline metal silicate and metal silicate to produce silicic acid gels. These silicic acid gels may react with the amino compound or may be used in excess to produce an inorganic-organic silicate composition. The aqueous alkali metal silicate solution containing silica sol is preferred. Crude commercial alkali metal silicates which contain other substances, e.g., calcium silicate, magnesium silicate, borates or aluminates may be used. The molar ratio of $Me_2OSiO_2$ (Me=metal) is not critical and may vary within the usual limits, but is preferably between 4 to 1 and 0.2 to 1.

The mols of the oxidated silicon compounds are based on the silicon dioxide content.

Component B

Any suitable amino compound may be used in my novel process. Typical amino compounds include urea, thiourea, alkylsubstituted thiourea, melamine, aniline, quanidine, saccharin, propyl urea, butyl urea, ammeline, dicyandiamide, aliphatic and aromatic diamines, other alkyl-substituted ureas and mixtures thereof. Urea is the preferred amino compound.

Component C

Any suitable aldehyde may be used, such as formaldehyde, acetaldehyde, butyaldehyde, chloral acrolein, furfural, benzaldehyde, crotonaldehyde and mixtures thereof.

Compounds containing active aldehyde groups such as hexamethylene tetramine may be used in this invention.

Formaldehyde is the preferred aldehyde in this invention.

Component D

Any suitable blowing agent and/or expanding agent may be used in this invention. Any suitable blowing agent may be used, including, for example, inert liquids boiling at temperatures of from $-25°$ C. to $+50°$ C. The blowing agents preferably have boiling points of from $-15°$ C. to $+40°$ C. The blowing agents are preferably insoluble in the aqueous solution of the mixture. Particularly suitable blowing agents are alkanes, alkenes, halogenated-substituted alkanes and alkenes or dialkyl ethers, such as, for example, saturated or unsaturated hydrocarbons with 4 to 5 carbon atoms such as isobutylene, butadiene, isoprene, butane, pentane, petroleum ether, halogenated or saturated or unsaturated hydrocarbons such as chloromethyl, methylene chloride, fluorotrichloromethane, difluorodichloromethane, trifluorochloromethane, chloroethane, vinyl chloride, vinylidene chloride and mixtures thereof.

Thus, any suitable highly volatile inorganic and/or organic substances may be used as a blowing agent, including those listed above. Additional suitable blowing agents are, for example, acetone, ethyl acetate, methanol, ethanol, hexane or diethylether. Foaming can also be achieved by adding compounds which decompose at temperatures above room temperature to liberate gases such as nitrogen, for example, azo compounds such as azoisobutyric acid nitrile. Other examples of blowing agents are included, for example, in Kunststoff-Handbuck, Volume VII, published by Vieweg and Hochtlen, Carl-Hanser-Verlag, Munich 1966, e.g., on pages 108 and 109, 453 to 445 and 507 to 510. The water contained in the mixture may also function as the blowing agent. Fine metal powders such as calcium, magnesium, aluminum or zinc may also be used as blowing agents since they evolve hydrogen in the presence of an alkaline aqueous solution, such as waterglass, and, at the same time, have a hardening and reinforcing effect.

The blowing agents may be used in quantities up to 50% by weight and, preferably, in quantities of from 1% to 10% by weight, based on the reaction mixture.

Foam can, of course, also be produced with the assistance of inert gases, especially air. For example, one or more of the reaction components can be prefoamed with air and then mixed with the others. The components can also be mixed, for example, by means of compressed air so that foam is directly formed, subsequently hardening in molds. More than one blowing agent may be used at the same time.

When an alkali metal or alkaline earth metal carbonate is used as the catalyst in the production of poly(aldehyde amino silicate) resinous product, and when a curing agent is used that will react with the alkali metal or alkaline earth metal carbonate, carbon dioxide is released and may be used as the blowing agent.

Component E

A curing agent is added when it is desirable to shorten the time required in the curing process. The curing process may be speeded up by the use of heat and/or a compound which reduces the pH to below 7. Any suitable organic or inorganic compound which will lower the pH below 7 may be used as the curing agent. The curing agent may act as a catalyst or react with one or more of the components in the mixture, thereby speeding up the curing process. Any suitable mixture of the curing agents may be used.

Suitable curing agents include, for example, mineral acids, hydrogen-containing salts of metals and ammonia, hydroxysalts, organic acids, organic acid anhydrides, phenols, isocyanates, polyisocyanate, alkylating agents, carbon dioxide, sulphonated polyisocyanates, ammonium halides, ammonium sulfates and mixtures thereof.

Suitable curing agents include mineral acids, e.g., sulfuric acid, hydrochloric acid, phosphoric acid, nitric acid and mixtures thereof.

Suitable hydrogen-containing salts may be used as curing agents, e.g., sodium hydrogen sulfate, sodium bicarbonate, sodium hydrogen phosphate, potassium hydrogen sulfate, calcium hydrogen sulfate, ammonium hydrogen sulfate, sodium dihydrogen phosphate, potassium dihydrogen phosphate and mixtures thereof.

Suitable salts of metal, ammonium and silicates which will react with alkali metal and alkaline earth metal oxides, hydroxides, carbonates and silicates to produce an alkali metal or alkaline earth metal salt may be used in this invention, such as aluminum chloride, aluminum fluoride, complex fluorides such as fluotitanate, fluosilicate, silicon tetrachloride, silicon trichloride, magnesium halides, ammonium halides, halides of heavy metals, diammonium acid phosphate, favorably salts of phosphoric acid and mixtures thereof.

Hydroxy salts may be used as the curing agent, e.g., barium hydrochloride, bismuth dihydroxychloride and mixtures thereof.

Halobenzoic acids may be used as the curing agent, e.g., o-bromobenzoic acid, O-chlorobenzoic acid, 2,4-dichlorobenzoic acid and mixtures thereof.

Various reactive groups which are capable of reacting with amino compounds are suitable curing agents. The following groups are given as specific examples of suitable ionic groups:

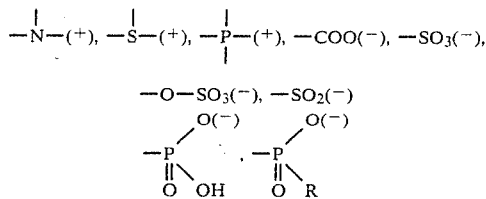

$R = C_1-C_{14}$-alkyl, $C_5-C_{10}$-cycloalkyl, $C_6-C_{10}$-aryl.

Various reactive groups which are capable of forming salt groups in the presence of alkali metal silicate may be used as curing agents such as

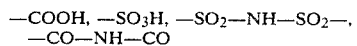

and phenolic OH— groups.

Various reactive groups which are capable of forming salt in the presence of alkali metal silicates and also reacting with the aldehyde-amino-silicate resinous product may be used.

The following groups are given as specific examples:

wherein R is an alkylene, aralkylene or arylene radical.

Alkylating agents may act as curing agents. The alkylating agent may be used for converting the basic reactant into the salt form. Examples of monofunctional alkylating agents are methyl chloride, methyl bromide, methyl iodide, ethyl bromide, propyl bromide, butyl bromide, dimethyl sulphate, diethyl sulphate, methyl chloromethyl ether, methyl-1,2-dichloroethyl ether, ethyl chloromethyl ether, benzyl chloride, benzyl bromide, p-chlorobenzyl chloride, trichlorobenzyl chloride, p-nitrobenzyl chloride, ethylene chlorohydrin, ethylene bromohydrin, epichlorohydrin, ethylene oxide, propylene oxide, styrene oxide, benzene, toluene- and naphthalene-sulphonic acid ester, ω-bromoacetophenone, dinitrochlorobenzene, α-chloropentenamide, chloroacetic acid and its esters and amides, chloromethyldimethyl-ethoxysilane, pentamethyl-bromomethyl-disiloxane, glycol monobromoacetic acid esters, glycerol monochloroacetic acid ester, bromoethyl isocyanate, chloromethyl naphthalene, 3-methyl-3-hydromethyl-oxetan-methane sulphonate, phenyl ethyl bromide, p-2-bromoethylbenzoic acid, 5-chloromethyl-furan-2-carboxylic acid, dichloroisopropyl ester of ethyl phosphonous acid, bromoethyl ester of acetoacetic acid, propane sultone, butane sultone and the like. Further examples may be found in DAS No. 1,205,087. Examples of polyfunctional alkylating agents are 1,4-dibromobutane; p-xylene-dichloride; 1,3-dimethyl-4,6-bis-chloromethyl-benzene; methylene-bis-chloroacetamide; hexamethylene-bis-bromoethyl urethane; adducts of 2–3 mols of chloroacetamide with 1 mol of di- or triisocyanate; and the like. Further examples of suitable polyfunctional alkylating agents may be found in Dutch Auslegeschrift No. 67/03743.

Inorganic and organic acids may also be used for salt formation and curing agents, including those which also have a chain-building function such as sulphurous acid, sulphuric acid, hypophosphorous acid, phosphinic acids, phosphonous acids and phosphonic acid, glycolic acid, lactic acid, succinic acid, tartaric acid, oxalic acid, phthalic acid, trimellitic acid and the like. Further examples of acids may be found in German Pat. No. 1,178,586 and in U.S. Pat. No. 3,480,592. Acids such as hydrochloric acid, fluoroboric acid, amidosulphonic acid, phosphoric acid and its derivatives, tartaric acid, oxalic acid, lactic acid, acetic acid and acrylic acid may be used as the binding agent, curing agent or be reacted first with the amino compound and may also be used as the salt-binding agents. The various curing agents or salt-binding agents may also be in combination.

Compounds which react with water to produce $CO_2$ may be used as the curing agent and may react with the poly(aldehyde amino silicate) resinous product. Suitable compounds which react with water to produce $CO_2$ include isocyanates, polyisocyanates, isocyanate-terminated urethane prepolymers, inorganic isocyanates, polythioisocyanates, sulphonated polyurethanes and mixtures thereof. The polyisocyanates are added in sufficient amount to react with the alkali metal group present and the free silicic acid groups present.

It is generally preferred to use commercially readily available polyisocyanates such as polyphenyl-polymethylenepolyisocyanates, obtained by aniline-formaldehyde condensation followed by phosgenation ("MDI"), polyisocyanate which contain carbodiimide groups, urethane groups, allophanate groups, isocyanurate groups, urea groups or biuret groups ("modified polyisocyanates"), and tolylene-2,4- and -2,6-diisocyanate and any mixture of these isomers ("TDI").

DETAILED DESCRIPTION OF THE INVENTION

The preferred process to produce amino silicate compounds is to mix 0.5 to 2 mols of Component A (oxidated silicon compound) with 1 mol of Component B (amino compound) in an aqueous solution, then to heat the mixture while agitating at a temperature from about 70° C. to above the melting point, but below the boiling point, of the amino compound for at least 20 minutes, whereby an amino silicate compound is produced. The pH of the mixture in the production of amino silicate compounds may be basic, neutral or acidic, but the reaction is enhanced by a basic pH or an acidic pH. The acetic catalysts most commonly used are sodium hydrogen sulfate, sulfuric acid, hydrochloric acid, formic acid, acetic acid, and acid esters, such as acid alkyl phosphates. The most common basic catalysts are sodium carbonate, calcium hydroxide, sodium hydroxide, potassium carbonate, potassium hydroxide, ammonia, alkali metal silicates and alkanolamines. The alkali or acidic catalyst may act as a catalyst directly, or it may react slightly with one or the other of the primary reactants. From about 1 to 10 weight percent catalyst used, based on the weight of Components A and B, gives best results.

The preferred process to produce a poly(aldehyde amino silicate) resinous product is to mix 1 mol of the amino silicate compound with 1 to 5 mols of Component C (aldehyde), then to heat the mixture to a temperature of from about 70° C. to 150° C. while agitating for at least about 20 minutes, thereby producing a poly-(aldehyde amino silicate) resinous product. This process will take place in an acetic, neutral or basic pH. The acetic pH is preferred to be between 4 to 6.5, and the basic pH is preferred to be between 8 to 11. The curing agents of Component E may be used as the acetic catalyst. Latent catalysts may be used to catalyze the final conversion of the poly(aldehyde amino silicate) resinous product from the initial stages of resin formation to the infusible, insoluble product. The said resinous product may be converted to a fully hardened state by prolonged heating.

The preferred process to produce a foamed poly-(aldehydehyde amino silicate) resinous product is to mix about 1 mol of the amino silicate compound with 1 to 5 mols of an aldehyde compound which is reacted for 20 minutes or more; then a blowing agent is added, preferably a halogenated hydrocarbon with a boiling point below 100° C., up to 50% by weight, based on the weight of the reactants, preferably from 1% to 10% by weight, then is thoroughly mixed with the mixture. A curing agent is added in the amount sufficient to adjust the pH of the mixture to 4 to 6.5 while vigorously agitating for a few seconds. The chemical reaction is exothermic, and the mixture begins to foam. The foam is poured, pumped, or blown into a mold and hardens within 1 to 3 minutes to produce a foamed poly(aldehyde amino silicate) resinous product. In some cases, it is necessary to heat the mixture to above the boiling temperature of the blowing agent.

In an alternate method, the liquid poly(aldehyde amino silicate) resinous product is foamed with compressed air, then the curing agent is added. In some cases, it is best to use both compressed air and a blowing agent.

In an alternate method, an alkali metal or an alkaline metal carbonate is used as the catalyst to produce the poly(aldehyde amino silicate) resinous product; then a curing agent is added that will react with the alkali carbonate to produce carbon dioxide. The carbon dioxide acts as the blowing agent to produce foamed poly-(aldehyde amino silicate) resinous product.

In an alternate method to produce foamed poly(aldehyde amino silicate) resinous product, a polyisocyanate is added in sufficient amount to react with the silicic acid group and/or OH groups and water to produce carbon dioxide. The carbon dioxide acts as the blowing agent and also will react with any alkali metal group present. The polyisocyanate reacts with the poly(aldehyde amino silicate) resinous product. The polyisocyanate may be added up to 95% by weight, based on the reactants.

The quantitative ratios of the components are not critical in the production of the poly(aldehyde amino silicate) resinous products. This is of particular advantage because it means that dosages do not have to be exact, even in continuous production through metering devices and mixing chambers. Thus, it is even possible to use heavy-duty metering devices such as gear pumps.

The ratios of the essential reactants which lead to the aldehyde-amino-silicate resinous products of the invention may vary, broadly speaking, within ranges as follows:

(a) Component A from 1% to 95% by weight (oxidated silicon compounds)

(b) Component B from 2% to 40% by weight (amino compound)

(c) Component C from 2% to 65% by weight (aldehyde)

(d) Component D up to 50% by weight added to the reaction mixture (blowing agent)

(3) Component E up to the amount needed to produce a pH of 4 to 8 in the reaction mixture, or sufficient amount to react with the alkali groups present in the mixture, and up to 95% by weight, based on the weight of the reactants.

Products of low silicate content, for example, between 10% and 30% by weight, are prepared when it is desired that the organic polymer properties should be predominant. In products of high silicate, for example, 30% to 95% by weight is prepared when it is desired that the organic polymer properties should be predominant.

According to the invention, foam materials with excellent fire resistance are obtained if the sum of inorganic constituents, including fillers, is more than 30% by weight, but preferably more than 50% by weight, based on the total mixture.

High silicate contents, for example, from 50% to 95% by weight, are desirable in cases where the properties of an inorganic silicate material, especially material with high-temperature stability and relatively complete noninflammability, are essential requirements. In this case, the function of the poly(aldehyde amino silicate) resinous product is a high-molecular-weight polymer which reduces the brittleness of the product. Acid-liberating curing agents are usually used to harden the product. The use of acid-liberated curing agents such as organic phosphate compounds or phosphoric acid also improves the noninflammability properties. A polyisocyanate may be added with the acid-liberated curing agent in the desired amount up to about 95% by weight, based on the weight of the reactants.

The invention contemplates the use of suitable aqueous solution of an alkali metal silicate, containing 20% to 70% by weight of said alkali metal silicate, such as, for example, sodium silicate, potassium silicate or the like. Such aqueous silicates are normally referred to as "waterglass." It is also possible to make the silicate solution in situ by using a combination of alkali metal silicate and water. The alkali metal silicate may be added to an aqueous aldehyde solution. An excessive amount of the alkali silicate may be used and produces a gel by the addition of a compound that will react with the alkali metal group to produce a salt. The curing agents of Component E will react with the alkali metal group to produce a salt.

Water-binding components which may be used, according to the invention, include organic or inorganic water-binding substances which have, first, the ability to chemically combine, preferably irreversibly, with water and, second, the ability to reinforce the poly(aldehyde amino silicate) resinous product. The most preferred water-binding agents of the invention hold the water chemically bound until heated sufficiently, as in a fire. Thus, in a fire, the water is released and extinguishes the fire. The term "water-binding component" is used herein to identify a material, preferably granular or particulate, which is sufficiently anhydrous to be capable of absorbing water to form a solid or gel such as mortar or hydraulic cement. This component may be a mineral or chemical compound which is anhydrous, such as $CaO$ and $CaSO_4$, but may exist as a partial hydrate. The water-binding components, preferably used are inorganic materials such as hydraulic cements, synthetic anhydrite, gypsum or burnt lime.

Suitable hydraulic cements are, in particular, Portland cement, quick-setting cement, blast-furnace cement, mild-burnt cement, sulphate-resistant cement, brick cement, natural cement, lime cement, gypsum cement, pozzolan cement and calcium sulphate cement. In general, any mixture of fine ground lime, alumina and silica that will set to a hard product by admixture of water, which combines chemically with the other ingredients to form a hydrate, may be used. The most preferred forms of water-binding agents to be used in accordance with the invention are those materials which are normally known as cement. In other words, they are a normally powdered material with which water normally forms a paste which hardens slowly and may be used to bind intermixed rock or gravel and sand into rock-hard concrete. There are so many different kinds of cement which can be used in the production of the compositions of the invention and they are so well known that a detailed description of cement will not be given here; however, one can find such a detailed description in Encyclopedia of Chemical Technology, Volume 4, Second Edition, Published by Kirk-Othmer, pages 689–710, as well as in other well known references in this field. In particular, pages 685–697 of the aforementioned Volume 4, Second Edition of Kirk-Othmer's Encyclopedia, containing a detailed disclosure of the type of cement which may be used in the production of the compositions of this invention are incorporated herein by reference.

It is preferred to use polyisocyanates as the curing agent when water-binding components are added. Other curing agents may be used with the polyisocyanates.

Production of the aldehyde-amino-silicate resinous products, solid or foamed according to this invention, is simple. It is merely necessary for the components to come together; for example, one may mix Components A, B, C, D and E together and the mixture usually hardens immediately. They are not optically clear, but generally opaque or milky-white, but the addition of a water-binding agent may change the color. The components may be premixed in any suitable combination. Components A, B, C and D may be premixed, then E added; Components A and B, then C, D and E may be premixed, then mixed together; Components B and C, then A, D and E may be premixed, then mixed together; Components B and C may be reacted to produce prepolymer, using an excess of B or C to produce water-soluble prepolymer, and they may be further reacted with Components A, B, C, D and E.

When a curing agent or catalyst produces a pH of 4 to 6.5 in the mixture of the components, the hardening time is usually short, between 2 seconds and, at the most, about 5 minutes; when the components are mixed by a discontinuous process, the hardening time may be varied. When the pH of the mixture of the Components A, B, C and D is 7 to 12, the hardening time is prolonged and, in some cases, requires heat to harden the mixture.

In commercial production processes, by altering the pH to a pH of 4 to 6.5, short molding times result and hence, rapid manufacturing cycles. The so-called "pot lives," during which the mixtures are processible, are governed by the concentration of the ingredients and the pH of the mixture. The "pot life" is between 0.2 seconds and several days, but can be adjusted to the desired length of time.

The components may be mixed in any suitable mixer, such as a ribbon-type blender; then shortly after the mixing, they are poured onto a surface or into a mold where they are allowed to react to form aldehyde-amino-silicate resinous products. The components may be mixed in any of the suitable polyurethane foaming machines or urea formaldehyde foaming machines. A low-speed or a high-speed mixer, a blender or kneader may be used for mixing the components. The components may be mixed in an extruder which has one or more entrance ports so that the components may be either simultaneously injected and mixed or they may be separately added to the extruder.

When the water-binding component is also included in the reaction mixture, it is preferred to use a mixer such as is conventionally used in the building-construction trade, for example, for making mortar. The reaction mixture may be mixed in a low- or high-speed mixer, a blender, a kneader or an extruder. When a water-binding component is used, an acid curing agent is usually not used; if it is, however, it is used only in the amount necessary to react with any alkali metal groups present in the mixture. When alkali metal silicates are used, the water-binding agent is usually mixed first with Components B, C and D before the alkali metal silicate (Component A) is added, or all the components are mixed simultaneously. This is done to prevent preliminary solidification of the alkali metal silicate solution. It is preferred to use a polyisocyanate as the curing agent when a water-binding component is added.

When a technique of foaming in the mold under pressure is employed, molded parts with dense marginal zones and completely non-porous smooth surfaces can be obtained.

However, the process according to the invention is particularly suitable for in situ foaming on the building site. Thus, any type of hollow mold, of the kind made by formwork in the usual way, inside existing walls or between existing ceiling or floor joists, can be case or filled with foam.

The amino silicate compound produced by this invention may be used to produce useful resinous products with aldehydes, acetones, furans, isocyanates, polyisocyanates, epoxides, dicarboxylic acids and anhydrides, silicon tetrachloride, silicones, and may be copolymerized with unsaturated organic compounds and mixtures thereof. These resinous products may be used as adhesives, as coating agents for wood, fabric or metals, impregnants, molding powder, laminates or their manufacture, to produce foams which are useful for thermal-insulating material, for sound-insulating material, for shock-resistant packaging and as filler material.

Various poly(aldehyde amino silicate) resinous products are soluble in readily available organic solvents such as acetic acid, alcohols, etc., and may be used as tough coating agents on wood, metal, plastics, fabric, etc. Various aldehyde-amino-silicate resinous products may be ground into a powder, then molded into useful products by pressure, heat and/or latent catalyst. Plasticizers may be used to improve flexibility and adhesiveness. The resinous product can be molded, cast or injection-molded in cold or in heated molds, and allowed to harden in these molds, whether relief or solid or hollow molds; if desired, by centrifugal casting at room temperature or at temperatures of up to 200° C., and if desired, under pressure. In this respect, it is quite possible to use strengthening elements, whether in the form of inorganic and/or organic or metallic wires, fibers, webs, foams, woven fabrics, skeletons, etc., to produce hollow bodies such as containers, decorative elements, molds for casting-pattern design or for casting metals. When foams are used as fillers, the material may be used to make hollow bodies such as containers for products that may have to be kept moist or cool.

A particularly useful aspect of the invention derives from inclusion in the reaction mixture of solid substances which, by reason of the reaction, are thus distributed in the matrix of the end product. Thus, the invention may be applied to the production of rigid products in which the poly(aldehyde amine silicate) resinous product constitutes a precursor for a binding agent for a filler material, and when an excess of aqueous alkali metal silicate is used, it also acts as a precursor for a binding agent for a filler material, i.e., is converted, by the process of this invention, to a rigid matrix binding the particles together. The filler materials may be organic, inorganic, fibrous, particulate or powder, or mixtures of any of these, such as sand, alumina, dolomite, chalk, talcum, iron oxide, zeolites, basalt wool or powder, graphite, carbon black, alumino-silicates, magnesium, clay, and other particulate refractories; metal fibers, asbestos, C-fiber, glass fiber, rock wool, steel wool, aluminosilicate fibers, calcium silicate fibers and other fibrous refractories; wood flour, sawdust, wood chips, cork, straw, popcorn, coke and other organic or carbonaceous particles; paper pulp, cotton waste, cotton, jute, sisal, hemp, flax, rayon, or synthetic fibers such as polyester, polyamide and acrylonitrile fibers and other organic fibrous materials; Al-, Fe-, Cu-, Ag-powder, molybdenum sulphite, silicon powder, bronze or copper cloth, glass powder, lava and pumice particles, expanded clay particles, hollow glass beads, particles of filled or unfilled, foamed or unfoamed, stretched or unstretched organic polymers, including plastics and rubber waste. Of the number of suitable organic polymers, the following, which can be present, for example, in the form of powders, granulates, foam particles, beads, hollow beads, foamable or unfoamed particles, fibers, ribbons, woven fabrics, webs, etc., are mentioned purely by way of example: polystyrene, polyethylene, polypropylene, polyacrylonitrile, polybutadiene, polyisoprene, polytetrafluoroethylene, aliphatic and aromatic polyesters, melamine-urea or phenol resins, polyacetal resins, polyepoxides, polyhydantoins, polyureas, polyethers, polyurethanes, polyimides, polyamides, polysulphones, polycarbonates, and, of course, any copolymers as well. Inorganic fillers are preferred.

Generally, the composite materials according to the invention can be filled with considerable quantities of filler without losing their valuable property spectrum. The amount of fillers can exceed the amount of the components in the poly(aldehyde amino silicate) resinous products. In special cases, the aldehyde-amino-silicate resinous product of the present invention acts as a binder for such fillers.

In cases where higher amounts of fillers are used, it may be advisable to add water in order to obtain sufficient working properties; coarse fillers can be used in wet form; powdered fillers such as, e.g., chalk, alumina, dolomite, calcium hydroxide, magnesium carbonate or calcium carbonate can be used as an aqueous suspension.

Useful foam products may be produced by mixing the amino silicate compounds with an aldehyde such as an aqueous solution of formaldehyde in a mixing chamber, then adding a blowing agent, for example, dichlorodifluoromethane, trichlorofluoromethane, butane, isobutylene or vinyl chloride, so that, providing it has a suitable temperature for the reaction mixture issuing from the mixing chamber, it will simultaneously foam through evaporation of the blowing agent and will be cured, by the addition of a curing agent to a cellular solid. The chemical reaction of the reactants and curing agent usually provides adequate elevation of temperature to foam the mixture. The mixture may be heated when necessary. The foam may optionally contain emulsifiers, foam stabilizers, fillers and other additives. In addition, the initial reaction mixture can be expanded into a foam by the introduction of gases, optionally under pressure, such as air, methane, $CF_4$, noble gases, the resulting foam's being introduced into the required mold and hardened therein. Similarly, the amino silicate aldehyde solution, optionally containing foam stabilizers such as surfactants, foam formers, emulsifiers, and, if desired, other organic or inorganic fillers or diluents, may initially be converted by blowing gas into a foam, the resulting foam's subsequently being mixed in the mixer with the curing agent and, optionally, with an inorganic water-binding component, and the resulting mixture's being pumped or blown by air pressure into a mold and allowed to harden.

Instead of blowing agents, it is also possible to use inorganic or organic, finely divided hollow bodies such as expanded hollow beads of glass or plastics, straw, polyurethane silicate foam, expanded clay, urea, aldehyde foam, poly(aldehyde amino silicate) foam and the like, for producing foams. The poly(aldehyde amino silicate) binding agent may be produced in an alkaline or acidic pH. It may also be produced by adding the hollow bodies to the aldehyde-amino-silicate mixture containing a large excess of aqueous alkali metal silicate, then adding a curing agent while agitating until the alkali metal silicate forms a gel at a pH of about 10, and if desired, to a pH of 4 to 6.5; optionally, the water-binding component may be added, up to 95% by weight, based on weight of the reactants. Preferably, the curing agent is added only until the alkali metal silicate forms a gel and while the solution has a pH of 8 to 12. An excess of water-binding agent above the 95% by weight may be added, but, preferably, up to 95% by weight. The foams obtainable in this way can be used as insulating materials, cavity fillings, packaging materials, sound-proofing materials, etc., with favorable flame behavior. They can also be used with the water-binding agent as lightweight bricks or in the form of sandwich elements, for example, with metal-covering layers, in house, vehicle and aircraft construction.

The reaction mixtures can also be dispersed in the form of droplets, for example, in petrol, or may be foamed and hardened during free fall or the like, resulting in the formation of foam particles or foam beads.

It is also possible to introduce into the foaming reaction mixtures, providing they are are still free-flowing, organic and/or inorganic, foamable or already foamed particles, for example, expanded clay, expanded glass, wood, popcorn, cork, hollow beads of plastics, for example, vinyl chloride polymers, polyethylene, styrene polymers or foam particles thereof or even, for example, polysulphone, polyepoxide, polyurethane, polyurethane silicate, ureaformaldehyde, formaldehyde urea silicate, phenol formaldehyde, phenol formaldehyde silicate or polyimide polymers. One may allow the reaction mixture to foam through interstitial spaced in packed volumes of these particles and, in this way, produce insulating materials which are distinguished by excellent flame behavior. Combinations of expanded clay, glass or slate with the reaction mixture, according to the invention, are especially preferred.

When a mixture of aldehyde and amino silicate compound in an aqueous solution, optionally containing inorganic and/or organic additives and/or water-binding agents, is heated to a predetermined temperature, the curing agent and blowing agent, for example, a (halogenated) hydrocarbon, can be used not only for producing uniform foams or non-uniform foams containing foamed or unfoamed fillers, but it can also be used to foam through any given webs, woven fabrics, lattices, structural elements or other permeable structures of foamed materials, resulting in the formation of composite foams with special properties, such as, for example, favorable flame behavior; these foams may, optionally, be directly used as structural elements in the building of furniture, vehicles and aircraft.

The reaction mixture of the poly(aldehyde amino silicate) resinous product can also be used in the solid or foamed state to fill cavities, gaps, cracks, giving a very firm bond between the joined materials.

Very brittle lightweight foams of the kind which can be obtained, for example, by having a very high silicate content or by combination with equally brittle organic polymers or organic silicate polymers, can readily be converted by crushing in suitable machines into particulate or dustfine powders which can be used for a number of different purposes as organically modified silica fillers or in the form of particulate. This dustfine powder provides effective surface interaction with polymers and, in some cases, also a certain degree of surface thermoplasticity which makes it possible to produce high-quality molding compositions on which topochemical surface reaction can be carried out by the addition of crosslinking agents. The said particulate may be bound together to produce useful foams with bonding agents such as aqueous solution of alkali silicate, aqueous solution of starch, aqueous solution of aminoaldehyde polymers, aqueous emulsions and/or solution of vinyl polymers, diene polymers and their co-polymer, rubber, polysulfides and natural glues. These foams are useful for insulation and sound proofing. The aldehyde-amino silicate particulates may be poured or blown into walls and attics and may be used for insulation and sound proofing. These particulates may be washed to remove any excess salt and added to soil in order to improve its agrarian consistency. The foam particulates with water may be used as substrates for propagating seedlings, cuttings and plants or cut flowers.

Poly(aldehyde amino silicate) resinous putty products can be produced by using an excess of alkali metal silicate compounds in the reaction mixture. These putties may be used for filling cavities or cracks, as adhesives, as coating agents, etc. The putty products may also include water-binding agents. The putty is cured by evaporation of the water, by absorption of $CO_2$ from the air or by adding agents or hardeners.

The aldehyde-amino-silicate resinous solid or foamed product containing water-binding agents may be used as insulation and sound-proofing material, for building purposes, in model making, in mold production, etc. The aldehyde-amino-silicate resinous foamed product containing hydraulic cement produces a high strength, rebound elasticity and dimensional stability which are substantially non-inflammable, even at high temperatures.

Other substances, such as the surfactants, emulsifiers and foam stabilizers, may be used in the production of aldehyde-amino-silicate foam products. The surfactant may be anionic, cationic or nonionic, and a wide variety of such surfactants, available in commerce, may be used, e.g., long-chain alkyl sulfates, alkyl benzene sulfonates, alkyl naphthalene sulphonates, and like anionic agents; celyltrimethyl ammonium salts and like cationic agents; and the ethylene oxide condensates, per se, or with phenols or amines and like nonionic agents. It has been found in practice that the nonionic agents are generally to be preferred. The surfactants may be added up to 5% by weight, based on the weight of the reactants. An addition of silanes, polysiloxanes, polyether polysiloxanes or silyl-modified isocyanates can aid in mixing the components.

Examples of foam stabilizers are disclosed in U.S. Pat. No. 3,201,372 at Column 3, line 46 to Column 4, line 5. The foam stabilizers used are mainly water-soluble polyether siloxanes and may be added, up to 20% by weight, based on the reaction mixture. In many cases, the foam stabilizers and surfactants are not needed in this invention.

Other auxiliaries may, if desired, be used in, or subsequently introduced into, the reaction mixture, such as dispersants, odorants, hydrophobizing substances, enable the property spectrum of the foams in their moist or dry form to be modified as required.

Suitable flame-resistant compounds may be used which contain halogen or phosphorus, e.g., tributylphosphate; tris(2,3-dichloropropyl)-phosphate; polyoxyproplenechloromethylphosphonate; cresyldiphenylphosphate; tricresylphosphate; tris-(Beta-chloroethyl)-phosphate; tris-(2,3-dichloropropyl)-phosphate; triphenylphosphate; ammonium phosphate; perchlorinated diphenyl; perchlorinated terephenyl; hexabromocyclodecane; tribromophenol; dibromopropyldiene; hexabromobenzene; octabromodiphenylether; pentabromotoluol; poly-tribromostyrol; tris-(bromocresyl)-phosphate; tetrabromobisphenol A; tetrabromophthalic acid anhydride; octabromodiphenyl; tri-(dibromopropyl)-phosphate; calcium hydrogen phosphate; sodium or potassium dihydrogen phosphate; disodium or dipotassium hydrogen phosphate; ammoniumchloride; phosphoric acid; polyvinylchloride telomers; and chloroparaffins as well as further phosphorus and/or halogen-containing flame-resistant compounds as they are described, e.g., in "Kunststoff-Handbuch", Volume VII, Munic 1966, pages 110–111, which is incorporated herein by reference. The organic halogen-containing components are, however, preferred.

It is to be understood, however, that there may be other additives to the reaction mixture and that these may either take part in the reaction or may remain unchanged, but exist dispersed in the final product. In some cases, it is uncertain whether the additives take part in any reaction or not. Thus, for example, it has been found that the characteristics of the products may be usefully modified by the inclusion of preformed polymer, especially when in the form of an aqueous emulsion, such as polyvinyl acetate, the copolymers of vinyl acetate and acrylic acid or methyl acrylate or methyl methacrylate, and copolymers of styrene with acrylic acid, methyl acrylate, methyl methacrylate or other ethylenically unsaturated monomers and silicic acrylate resinous products as found in U.S. Pat. No. 4,011,253, acrylic silicate resinous products and copolymers of acrylic silicate with organic acrylates, vinyl monomers, organic allyl halides, allyl alcohol, organic dienes, aliphatic dichlorides, organic oxides, ethylene and propylene as found in U.S. Pat. No. 4,113,693, phenoplast, aminoplasts, phenol silicoformate compounds and their condensation products as found in U.S. Pat. No. 4,094,825, phenol silicate compounds and their condensation products as found in U.S. Pat. No. 4,032,511, polystyrene, polyacrylates, polymethacrylate, polyvinyl chloride, polyacrylonitrile, polymethylmethacrylate, polyamides with free $NH_2$ radicals, allyl halide polymers and mixtures thereof.

Other organic compounds, polymers and natural products may be used to modify the characteristics of the products such as phenol, cresol, resorcinol, allyl halides, lignin, lignin silicate, vinyl monomers, diene monomers, isocyanates, polyisocyanates, urethane prepolymers, phenolic-modified alkyl resins, polyester polymers, polyether polymers, starch, cellulose, rubber latex, furfuryl alcohol, and mixtures thereof.

Various vinyl monomers such as styrene, vinyl acetate, acrylonitrile, vinyl chloride, vinylidine chloride, vinyl toluenes, acrylic acid, chloroacrylic acid, fluoroacrylic acid, cychohexyl methacrylic acid, isobutyl methacrylic acid, bromoacrylic acid, hydracrylic acid, benzyl acrylic acid, methyl methacrylic ethyl methacrylate, and mixtures thereof may be used.

Various organic diene monomers such as butadiene, isoprene, chloroprene and mixtures thereof may be used. Various allyl halides such as allyl chloride, methallyl chloride and other allyl chlorides and mixtures thereof, having the general formula of:

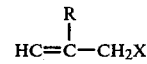

wherein R is hydrogen or a $C_1$ to $C_4$ alkyl group wherein X represents a halogen atom, may be used.

The vinyl monomers, organic dienes, allyl halides and mixtures thereof may be used, up to 30% by weight, based on the weight of the components in the reaction mixture. The peroxide initiators, alkali persulfate initiators and redox system may be used when desired.

It is the object of the invention to provide amino silicate compound. Another object of the invention is to provide amino silicate compound which reacts with aldehydes to provide relative low-cost poly(aldehyde amino silicate) resinous products of high strength, rebound elasticity and dimensional stability, even at high temperatures, which are substantially non-inflammable. A more specific object of the invention is to provide foamed (poly(aldehyde amino silicate) resinous products which combine the advantages of rapid setting, fair compression strength compared to the gross density, high thermal and acoustic insulation, high-flame resistance and excellent resistance to fire. Another object is to provide poly(aldehyde amino silicate) resinous-silica gel products, which may be foamed or unfoamed, which have high thermal and acoustic insulation, high-flame resistance and excellent resistance to fire. Another object is to provide poly(aldehyde amino silicate) resinous products, foamed or unfoamed, which contain a water-binding agent, and are of high strength, somewhat elastic, and have dimensional stability even at high temperatures, and are substantially non-inflammable. Still another object is to provide foamed or unfoamed poly(aldehyde amino silicate) resinous products which are reinforced with vinyl polymers, diene polymers and/or polyisocyanate polymers and which have high compression strength compared to the gross density, high thermal and acoustic insulation, high-flame resistance and excellent resistance to fire.

DESCRIPTION OF PREFERRED EMBODIMENTS

The following examples describe in detail embodiments of the process of my invention. These preferred processes may, of course, be varied as described above with similar results. Parts and percentages are by weight, unless otherwise indicated.

EXAMPLE 1

About 10 parts by weight of urea (Component B), 5 parts by weight of fine granular hydrated silica (Component A), 1 part by weight of granular sodium silicate and 15 parts by weight of an aqueous solution containing 37% by weight of formaldehyde (Component C) are mixed, then agitated at 60° C. to 100° C. for 20 to 120 minutes, thereby producing poly(formaldehyde-urea-silicate) resinous condensation product.

EXAMPLE 2

About 10 parts by weight of urea, 5 parts by weight of fine granular silica, 2 parts by weight of sodium hydroxide and 20 parts by weight of water are mixed, then heated while agitating at 90° C. to 120° C. for 20 to 30 minutes, thereby producing urea silicate.

EXAMPLE 3

About 1 mol of urea (Component B) and 1 mol of hydrated silica (Component A) are mixed, then heated to just above the melting point of urea while agitating for 20 to 60 minutes, thereby producing white granules of urea silicate.

EXAMPLE 4

One mol of fine granular hydrated silicat (Component A), 0.1 mol of sodium carbonate and one mol of the amino compound (Component B) listed below are ixed, then agitated while heating to above the melting point, but below the boiling temperature of the amino compound, for 20 to 60 minutes, thereby producing an amino silicate compound.
 (a) urea
 (b) thiourea
 (c) melamine
 (d) dicyandiamine
 (e) aniline
 (f) quanidine
 (g) saccharin
 (h) propyl urea
 (i) butyl urea

EXAMPLE 5

One mol of fine granular hydrated silica (Component A), 0.1 mol of potassium hydroxide and two mols of one of the amino (Component B) listed below are mixed, then agitated while heating to above the melting, or to just below the boiling, temperature of the amino compound for 20 to 60 minutes, thereby producing a diamino silicate compound.
 (a) urea
 (b) melamine
 (c) aniline
 (d) saccharin
 (e) butyl urea
 (f) thiourea
 (g) dicyandimaine
 (h) quanidine
 (i) propyl urea
 (j) mixtures thereof

EXAMPLE 6

Two mols of hydrated silica, 0.1 mol of sodium carbonate and one mol of urea are mixed, then heated to between the melting point and the boiling temperature of the urea while agitating for 20 to 60 minutes, thereby producing urea disilicate. Other amino compounds such as thiourea, melamine, aniline, dicyandiamine, quanidine, saccharin, propyl urea, butyl urea and mixtures thereof may also be used in place, or in combination with, urea.

EXAMPLE 7

About 20 parts by weight of fine granular hydrated silica, 2 parts by weight of potassium silicate, 30 parts by weight of melamine and 60 parts by weight of 37% aqueous solution of formaldehyde are mixed, then heated to 70° C. to 150° C. for 30 to 120 minutes while agitating, thereby producing poly(formaldehyde-melamine-silicate) resinous product. The resinous product is soluble in acetic acid and may be painted on wood to produce a hard, clear, protective coating. The granules of poly(formaldehyde-melamine-silicate) resinous product soften or melt at 70° C. to 90° C., and can be molded into useful objects or used as coatings which are resistant to strong acids and alkalis.

EXAMPLE 8

About 2 mols of urea, 1 mol of hydrated silicon, 1 mol of sodium silicate, and 3 mols of formaldehyde in a 37% aqueous solution are thoroughly mixed at a temperature between 20° C. and 80° C.; then hydrochloric acid is added until the pH is 4 to 6 and is rapidly mixed, thereby producing a white, solid poly(formaldehyde-amino-silicate) resinous product.

EXAMPLE 9

About 10 parts by weight of the diurea silicate as produced in Example 5 are mixed with 10 parts by weight of a 37% aqueous solution of formaldehyde containing sufficient sulfuric acid to produce a pH of 4 to 6 when mixed. The mixture is rapidly and thoroughly mixed, and the reaction is exothermic. In a short period of time, a white solid poly(formaldehyde urea silicate) resinous product is produced.

EXAMPLE 10

About 1 mol of thiourea (Component B), 1 mol of hydrated silica (Component A), 0.5 mol of sodium silicate (Component A) and 2 mols of furfural (Component C) are mixed, then heated to 60° C. to 100° C. for 20 to 120 minutes, thereby producing a poly(furfural thiourea silicate) resinous product.

Sufficient dilute hydrochloric acid (Component E) is thoroughly mixed with the poly(furfural thiourea silicate resinous product until the pH is 4 to 6.5; the reaction proceeds rapidly to produce a solid (furfural thiourea silicate) resinous product.

EXAMPLE 11

About 1 mol of urea (Component B), 1 mol of hydrated silica (Component A), 0.5 mol of granular commercial sodium silicate (Component A) and 2 mols of formaldehyde in an aqueous solution (Component C) are thoroughly mixed at a temperature of 20° C. to 100° C., then foamed by the use of compressed air (Component D). Then phosphoric acid (Component E) is added and rapidly mixed in the foam which is rapidly cured into a white solid, poly(formaldehyde urea silicate) foam.

EXAMPLE 12

About 10 parts by weight of urea silicate as produced in Example 5, 2 parts by weight of trichlorofluoromethane, and 10 parts by weight of 37% aqueous formaldehyde are thoroughly mixed; then sufficient calcium hydrogen phosphate is added until the pH is 4 to 6.5, and is rapidly mixed thoroughly for a few seconds. The mixture is poured into a closed mold which contains about 4 times the volume that is in the mixture. The curing proceeds rapidly and is exothermic. The mixture foams and is cured into a white solid porous poly(formaldehyde amino silicate) resinous product. The product has good insulating and flame-resistant qualities.

EXAMPLE 13

Component A: 10 parts by weight of commercial sodium silicate ($Na_2O:SiO_2=1:2$)
Component B: 10 parts by weight of urea
Component C: 20 parts by weight of 37% aqueous formaldehyde solution
Component D: 3 parts by weight of trichlorofluoromethane
Component E: 5 parts by weight of red phosphorus (powder)

Components A, B and C are thoroughly mixed; then Components D and E are mixed and added to the mixture of Components A, B and C. The reaction mixture is vigorously stirred for about 15 seconds and then poured into a mold. It begins to foam and solidifies into a fine, porous poly(aldehyde amino silicate) resinous product within 1 to 2 minutes.

EXAMPLE 14

Component A: 12 parts by weight of silica sol
10 parts by weight of waterglass (44% solids, molecular weight ratio $Na_2O:SiO_2=1:2$)
Component B: 20 parts by weight of urea
Component C: 30 parts by weight of 37% aqueous formaldehyde solution
Component D: 7 parts by weight of methylene chloride
Component E: Sulphonic acid in the amount to produce a pH of 4 to 6.5

Components A, B, C and D are thoroughly mixed, then Component E is added and vigorously stirred for about 15 seconds and then sprayed into a mold. It begins to expand in a few seconds and solidifies in 1 to 4 minutes to produce a fine, porous poly(aldehyde amino silicate) resinous product.

EXAMPLE 15

Component A: 10 parts by weight of silicoformic acid
5 parts by weight of calcium silicate
Component B: 10 parts by weight of urea
Component C: 15 parts by weight of 37% aqueous solution of formaldehyde
Component D: 5 parts by weight of trichloromethane
0.2 parts by weight of sodium dioctyl sulfosuccinate
Component E: sufficient dilute sulfuric acid to produce a pH of 4 to 6.5 in the mixture of the reactants
Water-binding agent: 10 parts by weight of gypsum Components A, B, C and D are thoroughly mixed; then Component E and the water-binding agent are added, and the mixture is vigorously stirred for a short period of time, then poured into a mold, thereby producing a rigid, porous, solid poly(aldehyde amino silicate) resinous product.

EXAMPLE 16

Component A: 10 parts by weight of commercial sodium silicate (molar ratio of $Na_2O:SiO_2=1:3.3$)
Component B: 5 parts by weight of urea
5 parts by weight of melamine
Component C: 10 parts by weight of a 37% aqueous solution of formaldehyde
5 parts by weight of acetoaldehyde
Component D: 4 parts by weight of methanol compressed air used for foaming
Component E: 4 parts by weight of epichlorohydrin phosphoric acid in sufficient amount to produce a pH of 4 to 6.5
Surfactant: 0.5 part by weight of soap Components A, B, C and D are thoroughly mixed with compressed air and foamed. Component E is added to the foam and thoroughly mixed by vigorous stirring with compressed air, then sprayed in place in a mold where it expands 3 to 12 times its original volume and rapidly solidifies into a porous, rigid poly(aldehyde amino silicate) resinous product.

EXAMPLE 17

Component A: 5 parts by weight of commercial potassium silicate
10 parts by weight of silica sol
Component B: 10 parts by weight of urea
5 parts by weight of dicyandiamide
Component C: 20 parts by weight of 37% aqueous solution of formaldehyde
10 parts by weight of a vinyl monomer
Component D: 5 parts by weight of methylene chloride
Component E: 6 N sulfuric acid with equal parts by weight of concentrated phosphoric acid
Surfactant: 0.1 part by weight of sodium salt of a sulphochlorinated paraffin Components A and B are mixed, then agitated at 70° C. to 100° C. for at least 20 minutes; then Component C, containing a vinyl monomer or mixture thereof, selected from the list below, Component D and the surfactant are thoroughly mixed with the amino silicate compound at a temperature below the boiling point of the vinyl monomer. Then Component E is added and thoroughly mixed, and the mixture foams, then solidifies in 1 to 3 minutes, thereby producing a foamed, poly(aldehyde amino silicate) resinous product reinforced with a vinyl polymer.

The vinyl monomers include styrene, vinyl chloride, acrylonitrile, vinyl acetate, vinylidine chloride, vinyl toluenes, acrylic acid, methacrylic acid ethyl acrylic acid, crotonic acid, chloroacrylic acid, fluoroacrylic acid, cyclohexyl methacrylic acid, isobutyl methacrylic acid, bromoacrylic acid, hydroacrylic acid, benzyl acrylic acid, methyl methacrylate, ethyl methacrylate and mixtures thereof.

EXAMPLE 18

Component A: 10 parts by weight of silica sol
5 parts by weight of fine granular talc which has been washed with dilute sulfuric acid
Component B: 20 parts by weight of urea
5 parts by weight of aniline
0.2 parts by weight of sodium carbonate Component C: 20 parts by weight of formaldehyde
  5 parts by weight of furfural
  0.5 parts by weight of detergent
Component D: compressed air
Component E: hydrochloric acid
Additive: 10 parts by weight of allyl chloride
  5 parts by weight of methallyl chloride Components A and B are mixed in 15 parts by weight of water, then agitated at 70° C. to 100° C. for at least 20 minutes; then Component C is added and the mixture is agitated at 70° C. to 100° C. for 30 to 60 minutes, thereby producing an aqueous solution of poly(aldehyde amino silicate) resinous product. The additive is thoroughly mixed with the said mixture, then foamed with air. Component E is foamed and then thoroughly mixed with the foamed poly(aldehyde amino silicate) resinous product. The foam is poured into a mold and in 1 to 3 minutes, produces a rigid, foamed poly(aldehyde amino silicate) resinous product.

EXAMPLE 19

Component A: 10 parts by weight sodium silicate
Component B: 10 parts by weight of concentrated aqueous ammonia solution
Component C: 10 parts by weight of 37% aqueous formaldehyde solution
Component D: 5 parts by weight of vinylidine chloride
Component E: aqueous ammonium sulfate solution Components A and B are mixed, then Component C is added, then heated to 70° C. to 100° C. for 20 to 60 minutes. Component E is then added while agitating until the solution gels, thereby producing a solid poly(aldehyde amino silicate) resinous product.

EXAMPLE 20

Component A: 10 parts by weight of sodium silicate
Component B: ammonia which is produced from the reaction of Components A and E
Component C: 10 parts by weight of 37% aqueous formaldehyde solution
Component D: compressed air
Component E: aqueous ammonium chloride solution Components A and C are thoroughly mixed; then foamed Component E is added until the mixture gels, thereby producing a rigid, foamed poly(aldehyde amino silicate) resinous product.

EXAMPLE 21

Example 20 is modified by adding 10 parts by weight of Portland cement just before Component E is added, thereby producing a rigid foamed concrete poly(aldehyde amino silicate) resinous powder.

EXAMPLE 22

Component A: 5 parts by weight of sodium silicate
  5 parts by weight of silica sol
Component B: 10 parts by weight of urea
Component C: 10 parts by weight of 37% aqueous solution of formaldehyde
Component D: 5 parts by weight of methyl chloride
Component E: 10 parts by weight of toluene diisocynate
Surfactant: 0.1 part by weight of detergent Components A and B are mixed in an aqueous solution, then heated at 70° C. to 100° C. while agitating for 20 to 30 minutes; then Component C is added and agitated for about 20 minutes. Components D and E and the surfactant are added to the mixture and vigorously mixed. The mixture rapidly foams, and in 1 to 3 minutes produces a tough, rigid, foamed poly(aldehyde amino silicate) resinous product.

EXAMPLE 23

Example 22 is modified by adding 20 parts by weight of quick-setting cement just before Components D and E are added to the mixture, aqueous poly(aldehyde amino silicate) resinous product. The mixture is vigorously mixed for about 15 seconds, then poured into a mold. The mixture becomes a hard, rigid, tough, porous concrete.

EXAMPLE 24

Component A: 2 mols fine granular hydrated silica
  0.2 mols of sodium carbonate (catalyst)
Component B: 2 mols of urea
Component C: 1 mol of 37% aqueous formaldehyde solution
Component D: The carbon dioxide realeased when the curing agent reacts with sodium carbonate (catalyst)
Component E: 0.5 mol of 6N hydrochloric acid in 2 mols of 37% aqueous formaldehyde solution
Surfactant: 2% by weight of detergent, based on the weight of the reactant Components A, B and C are mixed, then heated to 70° C. to 100° C. for 20 to 60 minutes to produce a poly(aldehyde amino silicate) resinous product with free amino groups. The surfactant is added to the resinous product and mixed thoroughly. Component D is added to the resinous product and vigorously agitated, thereby producing a foam. The foam is then poured into a mold and hardens in 1 to 3 minutes, thereby producing a rigid, foamed poly(aldehyde urea silicate) resinous product.

It is, of course, to be understood that the foregoing Examples are intended to be illustrative only and that numerous changes can be made in the ingredients, proportions and conditions disclosed therein without departing from the spirit of the invention as defined in the appended Claims. Other modifications within the scope of the invention will be apparent to those skilled in the art.

I claim:;
1. An amino silicate compound obtained by reacting a mixture of components:
  A. 0.5 to 2 mols of an oxidated silicon compound selected from the group consisting of hydrated silica, alkali metal silicates, natural silicates containing free silicic acid groups and
  B. 1 mol of an amino compound selected from the group consisting of urea, melamine, thiourea, dicyandiamide, alkyl-substituted ureas, alkyl-substituted thioureas, aniline and mixtures thereof.
2. The poly(aldehyde amino silicate) resinous product obtained by reacting an amino silicate compound as produced in claim 1 with Component
  C. An aqueous solution of formaldehyde in the ratio of 1 mol of amino silicate compound to 1 to 5 mols of formaldehyde.
3. The poly(aldehyde amino silicate) resinous product of claim 2 wherein an alkali catalyst is added to adjust the pH to a pH of 8 to 11 and is selected from the group consisting of sodium carbonate, potassium carbonate, sodium hydroxide, potassium hydroxide, alkali metal silicates, calcium hydroxide, alkanolamine and mixtures thereof.

4. The poly(aldehyde amino silicate) resinous product of claim 2 wherein a curing agent is added in sufficient amounts to adjust the pH to 4 to 8 or up to 95% by weight, based on the weight of the reactants, selected from the group consisting of mineral acids, hydrogen-containing acid salts, organic acids, acid alkyl phosphates, sulphonic acids, carboxylic acid chlorides, sulphonic acid chlorides, organic polyisocyanates and mixtures thereof.

5. The poly(aldehyde amino silicate) resinous product obtained by reacting a mixture of Components
   A. 0.5 to 4 mols of silica sol, mols being calculated on the silicon dioxide content,
   B. 1 mol of an amino compound selected from the group consisting of urea, thiourea, melamine, alkyl-substituted ureas, dicyandiamide, aniline, aliphatic and aromatic diamines and mixtures thereof,
   C. 1 to 5 mols of an aqueous formaldehyde solution.

6. The poly(aldehyde amino silicate) resinous product of claim 5 wherein the pH is adjusted to 8 to 11 with an alkali catalyst selected from the group consisting of sodium carbonate, potassium carbonate, sodium hydroxide, potassium hydroxide, alkali metal silicates, calcium hydroxide, alkanolamine and mixtures thereof.

7. The poly(aldehyde amino silicate) resinous product of claim 5 wherein the pH is adjusted to 4 to 6.5 with a curing catalyst, selected from the group consisting of mineral acids, hydrogen-containing acid salts, organic acids, acid alkyl phosphates, sulphonic acid, carboxylic acid chlorides, sulphonic acid chlorides, and mixtures thereof.

8. The poly(aldehyde amino silicate) resinous product obtained by reacting a mixture of Components
   A. 1 to 50 parts by weight of an alkali metal silicate with a molar ratio of $Me_2OSiO_2$ (Me=metal) of between 4 to 1 and 0.2 to 1 and is selected from the group consisting of sodium silicate, potassium silicate, lithium silicate, and mixtures thereof.
   B. 20 to 50 parts by weight of urea.
   C. 1 to 5 mols of a 37% aqueous formaldehyde solution for each mol of urea.

9. The poly(aldehyde amino silicate) resinous product of claim 8 wherein a curing agent (Component E) is added until the pH is 4 to 8 or up to 95% by weight, based on the weight of the reactants, and selected from the group consisting of mineral acid, hydrogen-containing acid salts, organic acids, acid alkyl phosphates, sulphonic acid, carboxylic acid chlorides, sulphonic acid chlorides, organic polyisocyanates and mixtures thereof.

10. The poly(aldehyde amino silicate) resinous product of claim 2 wherein an inorganic water-binding component which is capable of absorbing water to form a solid or gel is added in the amount up to 95% by weight, based on the reactants, and selected from the group consisting of hydraulic cement, synthetic anhydride, gypsum or burnt lime.

11. The poly(aldehyde amino silicate) resinous product of claim 5 wherein an inorganic water-binding component, being capable of absorbing water to form a solid or gel, is added in the amount up to 95% by weight, based on the reactants, and is selected from the group consisting of hydraulic cement, synthetic anhydride, gypsum or burnt lime.

12. The poly(aldehyde amino silicate) resinous product of claim 8 wherein the mixture contains an inorganic water-binding component, said water-binding component being capable of absorbing water to form a solid or gel, selected from the group consisting of hydraulic cement, synthetic anhydride, gypsum or burnt lime, and added in the amount up to 95% by weight, based on the reactants.

13. The poly(aldehyde amino silicate) resinous product of claim 2 wherein the mixture contains an inorganic or organic particulate or powder filler material.

14. The poly(aldehyde amino silicate) resinous product of claim 4 wherein the mixture contains an inorganic or organic particulate, powder, or fibrous material.

15. The aldehyde-amino-silicate resinous product of claim 8 wherein the mixture contains an inorganic or organic particulate, powder, or fibrous material.

16. The aldehyde-amino-silicate resinous product of claim 9, wherein the mixture contains glass fibers.

17. The poly(aldehyde amino silicate) resinous product obtained by reacting an amino silicate compound as produced in claim 1 with Component
   C. Furfural in the ratio of 1 mol of amino silicate compound to 1 to 5 mols of furfural.

18. The poly(aldehyde amino silicate) resinous product of claim 17 wherein a curing agent is added in the amount to adjust the pH to 4 to 6.5 and is selected from the group consisting of mineral acids, hydrogen-containing acid salts, organic salts, carboxylic acid chlorides, sulphonic acid chlorides and mixtures thereof.

19. The aldehyde-amino-silicate resinous product of claim 17 wherein an inorganic water-binding component which is capable of absorbing water to form a solid or gel is added in the amount up to 95% by weight, based on the reactants which are in an aqueous suspension, and selected from the group consisting of hydraulic cement, synthetic anhydride, gypsum or burnt lime.

20. The poly(aldehyde amino silicate) resinous product of claim 2 wherein an additional component, a vinyl monomer, is added up to 30% by weight, based on the weight of the components, and is selected from the group consisting of styrene, vinyl acetate, acrylonitrile, vinyl chloride, vinylidine chloride, acrylic acid, methacrylic acid, ethyl acrylic acid, methyl methacrylate and mixtures thereof.

21. The poly(aldehyde amino silicate) resinous product of claim 2 wherein an additional component, an allyl halide, is added up to 30% by weight, based on the weight of the components, and is selected from the group consisting of allyl chloride, methallyl chloride and mixtures thereof.

22. The poly(aldehyde amino silicate) resinous product of claim 2 wherein an additional component, an organic diene, is added up to 30% by weight, based on the weight of the components, and is selected from the group consisting of butadiene, isoprene, chloroprene and mixtures thereof.

* * * * *